(12) United States Patent
Jaeger et al.

(10) Patent No.: US 12,445,116 B2
(45) Date of Patent: Oct. 14, 2025

(54) COMBINED PROCESS AND TEMPERATURE ADJUSTABLE VOLTAGE REGULATION

(71) Applicant: Huawei Technologies Co., Ltd., Shenzhen (CN)

(72) Inventors: Kent Jaeger, Cary, IL (US); Lawrence E. Connell, Naperville, IL (US); Neal Hollenbeck, Palatine, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/506,711

(22) Filed: Nov. 10, 2023

(65) Prior Publication Data

US 2024/0080019 A1 Mar. 7, 2024

Related U.S. Application Data

(63) Continuation of application No. PCT/US2021/031777, filed on May 11, 2021.

(51) Int. Cl.
*H03K 3/011* (2006.01)
*G05F 1/46* (2006.01)
*G06F 1/3296* (2019.01)
*H03K 3/03* (2006.01)

(52) U.S. Cl.
CPC ............ *H03K 3/011* (2013.01); *G05F 1/463* (2013.01); *G06F 1/3296* (2013.01); *H03K 3/0315* (2013.01)

(58) Field of Classification Search
CPC ..... H03K 3/0315; G06F 1/3203; G06F 1/324; G06F 1/3296; Y02D 10/00; G05F 1/463; G05F 1/462; G05F 1/461; G05F 1/56; G05F 1/565; G05F 1/567; G05F 1/575
See application file for complete search history.

(56) References Cited

U.S. PATENT DOCUMENTS

| 5,870,004 A | 2/1999 | Lu | |
|---|---|---|---|
| 2005/0218871 A1* | 10/2005 | Kang | ............... G06F 1/324 323/265 |
| 2008/0122546 A1 | 5/2008 | Shiramizu et al. | |
| 2015/0234400 A1 | 8/2015 | Takahashi et al. | |
| 2019/0131928 A1 | 5/2019 | Rachala et al. | |
| 2020/0169221 A1* | 5/2020 | Cai | ............... H03K 3/011 |

OTHER PUBLICATIONS

International Search Report and Written Opinion dated Aug. 16, 2021, International Application No. PCT/US2021/031777, pp. 1-12.

* cited by examiner

*Primary Examiner* — Ryan Johnson

(57) ABSTRACT

A device includes a temperature-variable voltage controller, in which the temperature-variable voltage controller comprises: a voltage regulator; a process monitor circuit coupled to the voltage regulator, in which the process monitor circuit includes a ring oscillator, and a frequency counter coupled to an output of the ring oscillator; and a temperature-variable current source coupled to the voltage regulator so that, during operation, the output voltage of the voltage regulator is compensated based on a change in temperature of the temperature-variable current source.

18 Claims, 8 Drawing Sheets

COMBINED PROCESS AND TEMPERATURE ADJUSTABLE VOLTAGE REGULATION

CLAIM OF PRIORITY

This application is a continuation of, and claims priority to, PCT Patent Application No. PCT/US2021/031777, entitled "COMBINED PROCESS AND TEMPERATURE ADJUSTABLE VOLTAGE REGULATION", filed May 11, 2021, which application is incorporated by reference herein in its entirety.

BACKGROUND

In radio-frequency (RF) transceivers, a local oscillator supplies a signal with a specified oscillation frequency to one or more mixer elements that use the supplied frequency to up-convert or down-convert a communication signal to another frequency. To compensate for potential worst case conditions (e.g., slow process corners and high temperatures) in order to meet phase noise requirements, the transceiver typically is designed with a higher supply voltage than necessary (i.e., is overdesigned), regardless as to whether the circuit is subject to such worst-case conditions. As a result of the overdesign, the circuit may consume more power than necessary during much of the circuit's operation, especially in cases where worst-case conditions are not met.

SUMMARY

The present disclosure relates to combined process and temperature adjustable voltage regulation.

In general, in some aspects, the subject matter of the present disclosure is directed to a device (or devices) that includes a temperature-variable voltage controller, where the temperature-variable voltage controller includes: a voltage regulator; a process monitor circuit coupled to the voltage regulator, where the process monitor circuit includes a ring oscillator, and a frequency counter coupled to an output of the ring oscillator; and a temperature-variable current source coupled to the voltage regulator so that, during operation, the output voltage of the voltage regulator is compensated based on a change in temperature of the temperature-variable current source.

Implementations of the device(s) can include one or more of the following features. For example, in some implementations, the voltage regulator includes: a first amplifier; and a voltage divider coupled to a first input of the first amplifier and to a voltage supply, where the voltage divider includes a first variable load element and a second variable load element.

In some implementations, the device(s) includes a process feedback circuit coupled to the frequency counter and to the voltage regulator, where the process feedback circuit is configured to adjust an output voltage of the voltage regulator based on an output value of the frequency counter, and where the feedback circuit is optionally configured to set a resistance value of the first variable load element and to set a resistance value of the second variable load element based on the output value of the frequency counter.

The feedback circuit can include: a microprocessor; and memory storing a lookup table, where the microprocessor is operable to select the resistance value of the first variable load element and the resistance value of the second variable load element from the memory based on the output value of frequency counter.

In some implementations, the temperature-variable current source includes a first current mirror, and an output current of the first current mirror is coupled to the voltage regulator. The first current mirror can include a first regulation resistor coupled to an output of the first amplifier and to a second input of the first amplifier.

In some implementations, the device(s) includes an additional current source coupled to the voltage regulator so that, during operation of the device, the output voltage of the voltage regulator is compensated based on a change in temperature of the temperature-variable current source and based on an output of the additional current source.

The additional current source can include a second current mirror, and where a current output of the additional current source is coupled to the voltage regulator.

The additional current source can include a second amplifier, where an output of the second amplifier is coupled to the second current mirror.

The temperature-variable current source and the additional current source can be coupled to the second input of the first amplifier of the voltage regulator.

In some implementations, the device(s) includes: a RF transceiver circuit component, where the temperature-variable voltage controller provides a supply voltage to the RF transceiver circuit component.

In some implementations, the device(s) is a mobile communication device.

In some implementations, the feedback circuit can include a microprocessor, where the microprocessor is operable to apply the output value of the frequency counter to a curve fitting function to derive the resistance value of the first variable load element and the resistance value of the second variable load element.

In general, in some other aspects, the subject matter of the present disclosure is directed to methods that include: running a process monitor circuit coupled to a voltage regulator on a same chip as the process monitor circuit, where running the process monitor circuit includes operating a ring oscillator, counting a frequency of an output of the ring oscillator, and configuring the voltage regulator based on the frequency of the output of the ring oscillator; and providing an output current from a temperature-variable current source to the voltage regulator so that the output voltage of the voltage regulator is compensated based on a change in temperature of the temperature-variable current source.

Implementations of the method(s) may include one or more of the following features. For example, in some implementations, configuring the voltage regulator based on the frequency of the output of the ring oscillator includes: selecting a resistance value of a first variable load element of the voltage regulator from memory based on the frequency of the output of the ring oscillator; and selecting a resistance value of a second variable load element of the voltage regulator from the memory based on the frequency of the output of the ring oscillator.

In some implementations, configuring the voltage regulator based on the frequency of the output of the ring oscillator includes obtaining a resistance value of a first variable load element and a resistance value of a second variable load element from a curve fitting function based on the frequency of the output of the ring oscillator.

In some implementations, the temperature-variable current source includes a first current mirror, and where an output current of the first current mirror is coupled to the voltage regulator.

In some implementations, the method(s) includes: providing an output current from an additional current source to the voltage regulator so that the output voltage of the voltage regulator is compensated based on a combined output current from the temperature-variable current source and the additional current source.

In some implementations, the additional current source includes a second current mirror, and where an output current of the second current mirror is coupled to the voltage regulator.

In some implementations, the method(s) includes providing the output voltage of the voltage regulator as a supply voltage to circuit component of an RF transceiver. Implementations of the subject matter disclosed herein can include one or more of the following advantages. For example, in some implementations, the devices and methods disclosed herein allow for regulation of a voltage output that compensates for process-induced voltage variations as well as temperature-induced voltage variations during operation of the device. Additionally, in some implementations, the compensation for process variations only needs to be performed once after the device is fabricated, e.g., at the factory. Compensation for temperature variations of the device during the device's operation can be performed using circuitry separate from the circuitry that compensates for process variations. Since the circuitry for compensating process variations is not needed for compensating temperature variations, at least some portions of that circuitry can be moved off-chip and thus increase useable chip space in the device. In some implementations, the circuitry for compensating temperature variations sets a temperature-dependent slope for an amount of voltage compensation. In certain implementations, the device can include additional circuitry for adjusting that temperature-dependent slope to compensate for inaccuracies in the temperature-variation of the voltage compensation.

The details of one or more embodiments are set forth in the accompanying drawings and the description below. Other features and advantages will be apparent from the description and drawings, and from the claims.

DETAILED DESCRIPTION

Figure 1A:
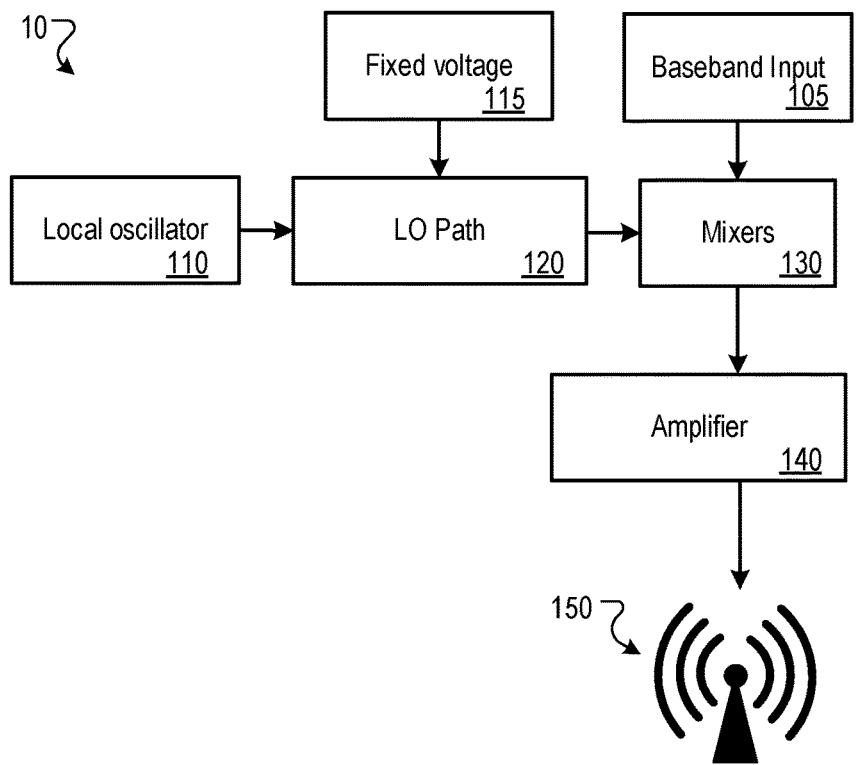
FIG. 1A is a block diagram of an example of a transmitter portion of a RF transceiver.

FIG. 1A is a block diagram of an example of a transmitter portion 10 of a radio-frequency (RF) transceiver. In RF transceivers, a local oscillator 110 supplies a frequency through a local oscillator (LO) path to one or more mixer elements 130 that use the supplied frequency to up-convert or down-convert the frequency of a communication signal, such as a communication signal from RF input 105. For instance, as shown in the transmitter of FIG. 1A, the supplied frequency is divided and/or buffered in LO path 120 prior to reaching the one or more mixer elements 130. The mixer elements 130 up-convert the frequency of the communication signal from baseband input 105, which is then provided to RF front-end circuitry 140, which includes a power amplifier, and then to an antenna 150 for transmission.

Figure 1B:
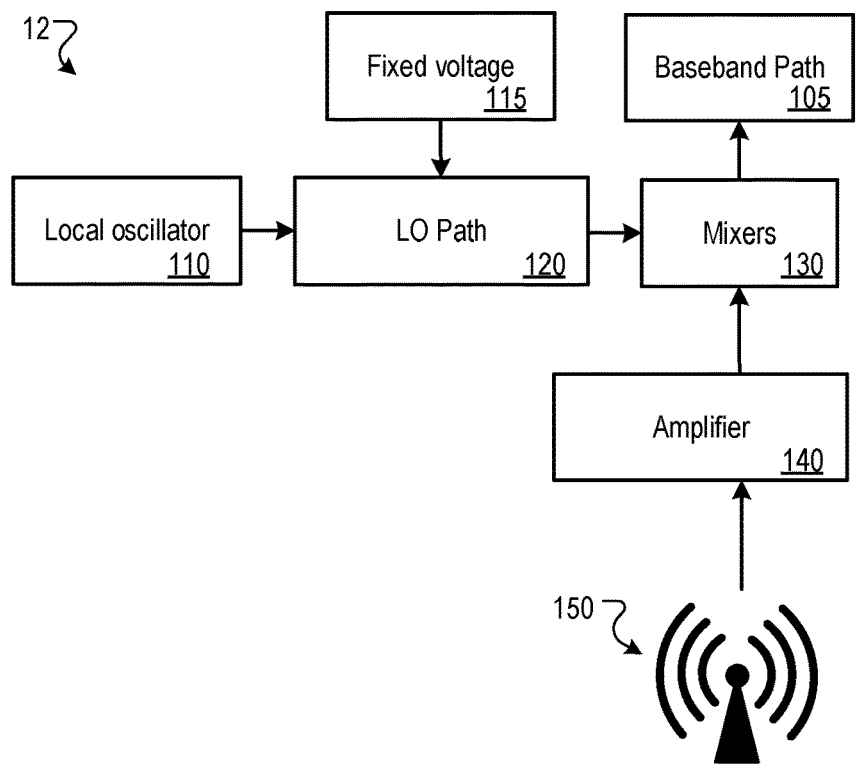
FIG. 1B is a block diagram of an example of a receiver portion of a RF transceiver.

FIG. 1B is a block diagram of an example of a receiver portion 12 of a RF transceiver. In receiver portion 12, the supplied frequency from the LO 110 is divided and/or buffered prior to reaching the one or more mixer elements through the LO path 120. The RF communication signal received by the antenna 150 is amplified by one or more amplifiers 140 and is passed to one or more mixer elements 130. The mixer elements 130 of the receiver 12 down-convert the frequency of the RF communication signal to a baseband signal, which is then provided to the rest of the baseband path 150 for further processing (e.g., filtering and amplification). The foregoing divisions and buffers of both the receiver circuit 12 and the transmitter circuit 10 are provided in what is called the local oscillator (LO) path 120.

Typically, a fixed voltage (e.g., fixed voltage 115) is provided as a supply to the LO path 120 from a voltage regulator such as a low-dropout regulator (LDO). However, process and temperature variations affect the current in the LO path 120, and thus the amount of phase noise transmitted through the circuit. For instance, the current transmission may be low when transistors in the LO path 120 are fabricated at a slow process corner and the temperature of operation of the transistors is high. With low current transmission, the transition time (e.g., time for transitioning between ground and supply voltages) will be slower, which allows more phase noise to be transmitted through the circuit.

To compensate for potential worst case conditions (e.g., slow process corners and high temperatures) and therefore meet phase noise requirements, the transmitter 10 (and/or receiver 12) can be overdesigned with a higher supply voltage, regardless as to whether the circuit is subject to such worst-case conditions. As a result of the overdesign, the transmitter 10 (and/or receiver 12) may consume more power than necessary during much of the circuit's operation, especially in cases where no worst-case condition is met.

The present disclosure is directed to an adjustable voltage regulation circuit that takes into account both process parameters and temperature variations to provide a continuously variable supply voltage. In particular implementations, the adjustable voltage regulation circuit of the present disclosure compensates for the process and temperature variations while providing a relatively small circuit design that reduces power consumption. Although the adjustable voltage regulation circuit and techniques of the present disclosure are presented for use with RF transceivers, such as the RF transmitter 10 and/or receiver 12 of FIGS. 1A-1B, the adjustable voltage regulation circuit disclosed herein can be used in any device that is otherwise subject to adverse phase noise and/or power drain caused by process and/or temperature variations. For instance, the adjustable voltage regulation circuit of the present disclosure can be employed in mobile electronic communication devices such as smart phones or touchscreen tablets, personal computers, or Bluetooth enabled devices, among others.

Figure 1C:
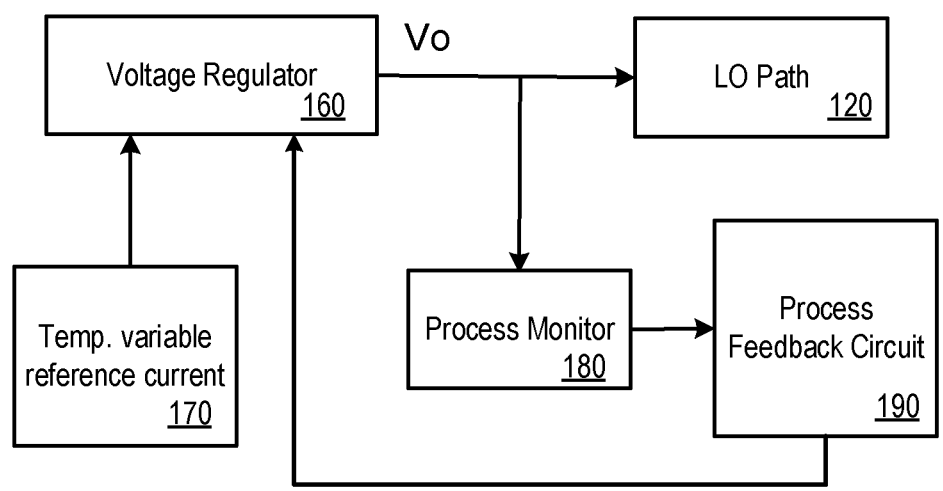
FIG. 1C is a block diagram of an example of a process and temperature-variable voltage controller.

FIG. 1C is a block diagram of an example of a process and temperature-variable voltage controller 100 according to the present disclosure. The voltage controller 100 includes a voltage regulator 160, such as a low dropout (LDO) voltage regulator. The voltage regulator 160 generates an output voltage, Vo, that, in turn, is provided to a circuit component, such as LO path 120 in the transmitter 10 (and/or receiver 12). The voltage regulated supply provided by the voltage regulator 160 moves in relation both to process variations, which are associated with the fabrication of the transistor circuit elements, and to temperature variations that occur during operation. Accordingly, as an example, the voltage controller 100 can be included as part of the RF transmitter circuit 10 (and/or receiver 12) to provide a regulated voltage supply to the LO path 120 and/or to any other components of the RF transceiver or other devices that can use a regulated voltage supply.

There are two parts to the voltage controller 100 that allow the process and temperature regulated voltage to be achieved. A first part includes a process monitor 180 that monitors the process corners characterizing the performance of the voltage regulator 160. For instance, depending on the environmental conditions of the fabrication process used to fabricate the transistors of the LO path 120, the process monitor 180 can be configured to output data that is indicative of whether the process corner is fast, slow or typical. In the present example, the process monitor 180 makes this determination based on monitoring the output voltage, Vo, produced by the voltage regulator 160. The process monitor 180 provides the output data to a process feedback circuit 190.

Using the output data from the process monitor 180, the process feedback circuit 190 adjusts the operational parameters of the voltage regulator 160 to modify the output voltage and thus compensate for the determined process corner. For instance, when the process measurements from process monitor 180 indicate a slow process corner, which results in reduced current transmission (and a corresponding increase in transmission time) in the LO path 120, the process feedback circuit 190 can adjust the operating parameters of the voltage regulator 160 so that the voltage regulator 160 provides an increase in supply voltage. The increased supply voltage increases the current drive in the LO path 120, decreasing the current transition time, and thus decreasing the time for the phase noise to transfer through the circuit. In contrast, when the process measurements from process monitor 180 indicate a fast process corner, which results in increased current transmission (and a corresponding decrease in current transmission time) in the LO path 120, the process feedback circuit 190 can adjust the operating parameters of the voltage regulator 160 so that the voltage regulator 160 reduces the supply voltage, and thus reduces power consumption of the circuit.

A second part of the voltage controller 100 includes a temperature-variable reference current 170 coupled to the voltage regulator 160. The temperature-variable reference current 170 provides a current whose magnitude varies with an operating temperature of the controller 100. Accordingly, as the temperature of the controller 100 changes, the level of current supplied to the voltage regulator 160 varies proportionally, leading to a corresponding change in the regulator output voltage. For instance, when the controller 100 is operating in a hotter temperature environment, the output voltage of the voltage regulator 160 increases, allowing higher current drive in the LO path 120, and subsequently a decrease in the time for phase noise to transfer through the circuit. In contrast, when the controller 100 is operating in a cooler temperature environment, the output of the voltage regulator 160 decreases, reducing the current drive in the LO path 120 and conserving power.

Figure 2:
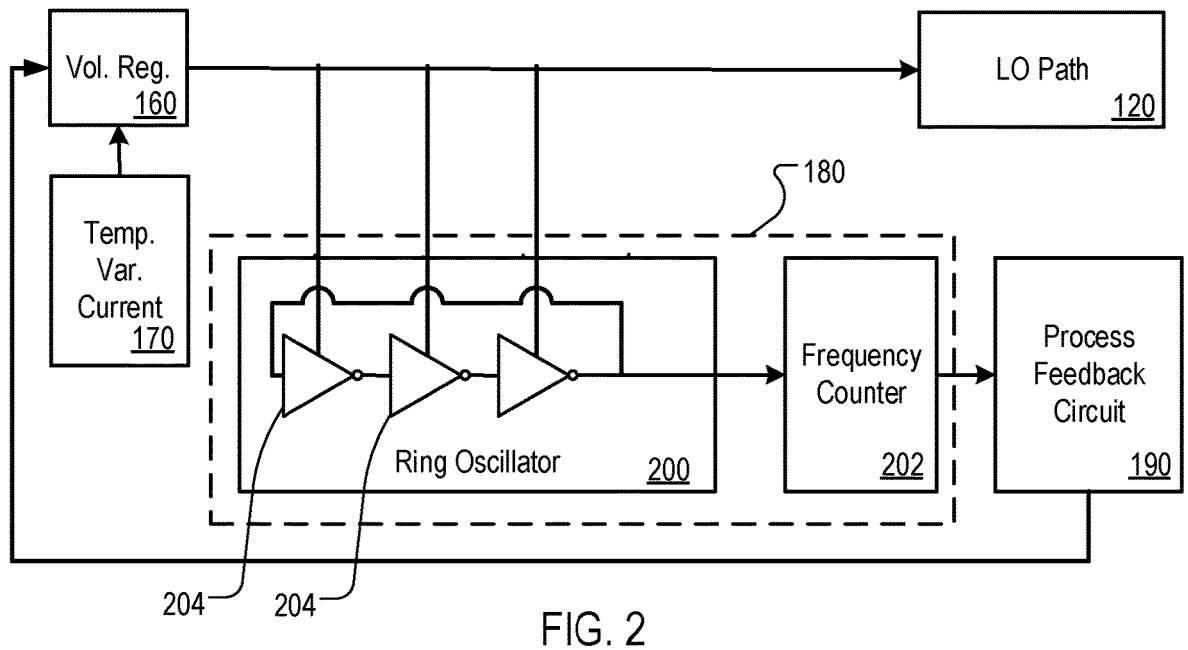
FIG. 2 is a schematic illustrating an example of a process and temperature-variable voltage controller.

FIG. 2 is a schematic illustrating an example implementation of the process and temperature-variable voltage controller 100 shown in FIG. 1C, in which the process monitor 180 is provided in more detail. The process monitor 180 in this example includes a ring oscillator 200 and a frequency counter 202 arranged to receive an output of the ring oscillator 200. The ring oscillator 200 includes multiple inverter circuit elements 204 arranged in a chain, with the output of the last inverter being fed back into the first inverter. Although three inverters are shown, the ring oscillator may include different odd numbers of inverters, such as five or seven, among others. Additionally, the output of the voltage regulator 160 is provided to each inverter circuit element 204 as a supply voltage. With this configuration, the output of the ring oscillator 200 is an oscillating voltage having a frequency that is proportional to the output voltage of the voltage regulator 160.

In some implementations, the process monitor 180 further includes a frequency counter 202. The frequency counter 202 counts the frequency of the oscillating voltage produced by ring oscillator 200. The frequency counter 202 and the process monitor 180 can be integrated on a common semiconductor die with the voltage regulator 160.

The frequency counter output, which includes, e.g., a value representing the frequency of the oscillating voltage produced by ring oscillator 200, is passed to a process feedback circuit 190. The process feedback circuit 190 then evaluates the frequency counter output and can be used to adjust operational parameters of the voltage regulator 160 to modify its output voltage based on the value indicated by the frequency counter output. For instance, the process feedback circuit 190 can include a processor (e.g., a microprocessor) and memory storing instructions that, when executed by the processor, cause the processor to perform operations including comparing the frequency counter output with values in a lookup table. The lookup table can include settings for the voltage regulator 160 that correspond to particular frequency counter values or particular ranges of frequency counter values.

When the frequency counter output is matched with an entry in the lookup table, the process feedback circuit 190 can then apply the settings for that particular entry to the voltage regulator 160. The entries in the lookup table of the process feedback circuit 190 can include, e.g., resistance settings for variable load elements (e.g., variable resistors) of the voltage regulator 160. The entries of the lookup table can be based on pre-established process models. As an example, a frequency of the oscillating voltage in a first range may correspond to a slow process corner. Thus, an entry in the lookup table for that first entry can include a setting for the voltage regulator 160 that causes the voltage regulator 160 to increase an output voltage to compensate for the slow process corner.

Similarly, a frequency of the oscillating voltage in a second range higher than the first may correspond to a typical process corner. An entry in the lookup table for that second entry can include a setting for the voltage regulator 160 that causes the voltage regulator 160 to maintain an output voltage at its current level. A frequency of the oscillating voltage in a third range that is higher than both the first and second range may correspond to a fast process corner. An entry in the lookup table for that third entry can include a setting for the voltage regulator 160 that causes the voltage regulator 160 to decrease an output voltage to compensate for the fast process corner. The lookup table can be stored in the memory of the process feedback circuit 190.

As an alternative to a lookup table, the process feedback circuit 190 can apply a curve fitting program to the frequency counter output that is received and, from the applied curve fit, determine a corresponding configuration setting for the voltage regulator 160 that sets the output voltage at an appropriate level for typical conditions. Then the process feedback circuit 190 can apply that determined setting to the regulator 160. For instance, the curve fitting program can be used by the process feedback circuit 190 to derive resistance values for load elements in the regulator 160.

Though the process feedback circuit 190 is shown in FIG. 1 as separate from the process monitor 180, in some cases, the process feedback circuit 190 can be included as part of the process monitor 180. In some implementations, process feedback circuit 190 is provided separately off-chip (e.g., not on the same die) from the process monitor 180 that includes the ring oscillator 200 and the frequency counter 202. In some implementations, both the frequency counter 202 and the process feedback circuit 190 are provided separately and off-chip from the ring oscillator 200. In this way, the process characterization and compensation of the voltage regulator 160 can be performed at the factory, without having to design and build the process feedback circuit 190 or the frequency counter 202 and the process feedback circuit 190 on the chip.

Providing the process feedback circuit 190 (and, optionally, the frequency counter 202) as a separate off-chip circuit element can increase the useable space of the chip on which the voltage controller 100 is formed. Furthermore, after the voltage controller 100 is configured based on the feedback testing, packaging of the controller 100 can be completed and the process monitor 180 no longer needs to be used, even during later operation of the controller 100. Alternatively, in some implementations, each of the process monitor 180 and the process feedback circuit 190 (either of which can include the frequency counter 202) can be formed on the same die. In such an example, the lookup table entries and/or instructions for executing the curve fitting application also can be stored in memory on the same die as the voltage controller 100 or off-chip.

Figure 3:
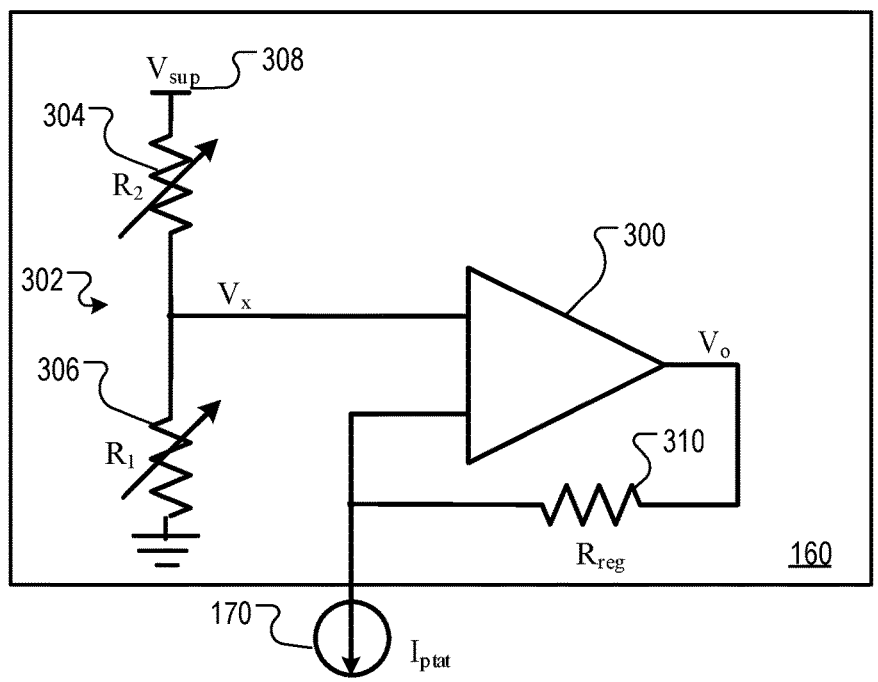
FIG. 3 is a schematic of an example of a voltage regulator coupled to a temperature variable current source.

As explained herein, the entries in the lookup table of the process feedback circuit 190 can include, e.g., resistance settings for variable load elements of the voltage regulator 160. FIG. 3 is a schematic of an example of the voltage regulator 160, which includes variable load elements. In particular, the voltage regulator 160 includes a voltage divider 302 that includes a first variable load element 304 and a second variable load element 306, with the first variable load element 304 coupled to a stable supply voltage 308 (Vsup) and the second variable load element 306 coupled to ground. The center of the voltage divider 302 between variable load elements 304 and 306 provides a voltage, Vx, that is coupled to a first input of an amplifier 300 (e.g., operational amplifier). The entries of the lookup table of the process feedback circuit 190 can include values for the variable load elements 304, 306 that cause the voltage regulator 160 to provide the output voltage, Vo, that is compensated based on the detected process corner.

A second input of the amplifier 300 is coupled to the temperature-variable current supply 170, as also shown in FIG. 3. The temperature-variable current supply 170 provides a current whose magnitude varies with an operating temperature of the controller 100. In this way, compensation for temperature variations of the voltage controller 100 during the controller's operation are performed separately from compensation of the controller process corners.

The current, Iptat, provided by supply 170 can be expressed as:

$$I^*_{ptat} = m_{ptat} \frac{kT}{qR_{ptat}} \ln(x),$$

where T is the operating temperature of the supply 170 (e.g., the temperature of the die on which controller 100 is formed), $m_{ptat}$ is a multiplier whose value is determined based on the design of the supply 170, $R_{ptat}$ is a load resistance value of the supply 170, k is Boltzmann constant, q is the value of an electron charge, and x is the transistor ratio of Q1 and Q2 in the current supply 170.

Taken together with the voltage divider 302, the output voltage, Vo, of the voltage regulator 160 can be expressed as:

$$V_o = \frac{V_{sup}}{1 + \frac{R_2}{R_1}} + m_{ptat} \frac{kT}{q} \frac{R_{reg}}{R_{ptat}} \ln(x),$$

where $R_{reg}$ is a value of the load element 310 (also referred to as a regulation resistor) that is coupled between the output of amplifier 300 and the second input to amplifier 300. As can be seen from the foregoing equation, the output voltage Vo thus varies based both on the particular load resistance values of the voltage divider 300, as set by the process monitor 180 and process feedback circuit 190, and on the temperature-variable current of the supply 170. The first term on the right side of the equation is used to program according to the process corners by adjusting the $R_2/R_1$ load ratio to give the desired output voltage at typical conditions for the voltage controller 100. The second term, $$m_{ptat} \frac{kT}{q} \frac{R_{reg}}{R_{ptat}} \ln(x),$$

on the right side of the equation modifies the voltage as a function of temperature, such that a higher output voltage is generated when the voltage controller 100 is hot and a lower output voltage when the voltage controller 100 is cold. Accordingly, the output voltage can be adjusted for temperature variations and different process corners.

Figure 4A:
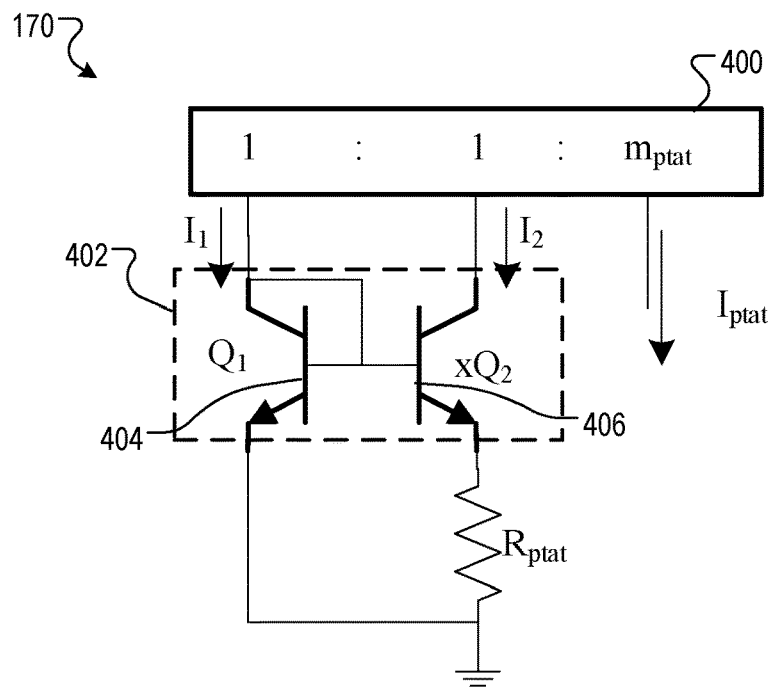
FIGS. 4A-4B are schematics that illustrate examples of a temperature variable current source.
Figure 4B:
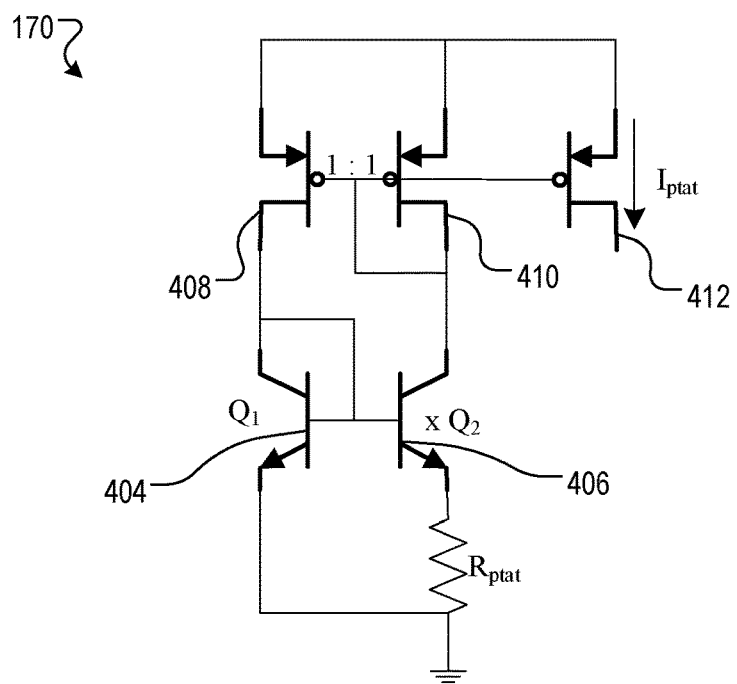

FIGS. 4A-4B are schematics that illustrate example configurations of the temperature variable current source 170. The design shown in FIGS. 4A-4B is just one example of a temperature-variable current source, but other configurations can be used instead. As shown in FIG. 4A, the current source 170 includes a first current mirror structure 400 coupled to a second current mirror structure 402. The first current mirror structure 400 is configured to produce an output current, $I_{ptat}$, that is a multiple, $m_{ptat}$, of the current $I_1$ and $I_2$ flowing into the second current mirror structure 402.

The output current $I_{ptat}$ is provided as a current source to the voltage regulator. For example, as shown in FIG. 3, the output current $I_{ptat}$ is provided to the second input of amplifier 300. The second current mirror structure 402 in the present example is a bipolar junction transistor current mirror that includes at least one first transistor 404 (depicted as Q1) and two or more second transistors 406 (depicted as Q2), in which the second transistors 406 are coupled in parallel. The value x denotes the ratio of transistors 406 to transistors 404 in the second current mirror structure 402 and is preferably greater than 1. For example, if x=8, and if the second current mirror structure 402 includes a single first transistor Q1, then the number of second transistors Q2 is 8. If the number of first transistors Q1 in parallel in the second current mirror structure 402 is 2, then the number of second transistors Q2 in parallel in the second current mirror structure is 16. Both the value of the load element, $R_{ptat}$, and the multiple x of transistors 406 to transistors 404 can be chosen to provide a desired output current $I_{ptat}$.

FIG. 4B is a schematic that shows a specific example structure of the first current mirror 400 based on field effect transistors. Other current mirror designs for structure 400 and structure 402 are also possible. In the example structure shown in FIG. 4B, the first current mirror is a field effect transistor current mirror that includes three field effect transistors: first field effect transistor 408, second field effect transistor 410, and third field effect transistor 412. Each of the field effect (FET) transistors 408, 410, and 412 are of the same conductivity type, e.g., they are all PMOS FETs. The first FET transistor 408 provides current $I_1$ to transistor $Q_1$ 404 of the second current mirror. The second FET transistor 410 provides current $I_2$ to the x transistors $Q_2$ 406 of the second current mirror, such that $I_1 = I_2$. The third FET transistor 412 provides the output current $I_{ptat}$, which is some multiple $m_{ptat}$ of $I_1$ and $I_2$. $I_{ptat}$ can be expressed as $$I_{ptat} = m_{ptat} \frac{kT}{\left(1 + \frac{1}{\beta}\right) q R_{ptat}} \ln(x),$$

where the value $\beta$ is the forward current gain of a bipolar junction transistor. If the value $\beta$ is large enough the parameter $(1+1/\beta)$ can be approximated as 1.

In view of the foregoing, the values of the load elements set by the feedback circuit 190 thus provide an offset to Vo of voltage regulator 160 that is fixed based on the determined process corners, whereas the variable current supply 170 sets a temperature-dependent slope for the value of Vo. In some implementations, it may be useful to alter the temperature-dependent slope of Vo. For instance, it may be desirable to reduce the magnitude of increase in the voltage regulator output voltage as the temperature of the voltage controller 100 is increased. This may occur, e.g., when the model on which the process feedback circuit is based is not accurate.

Figure 5:
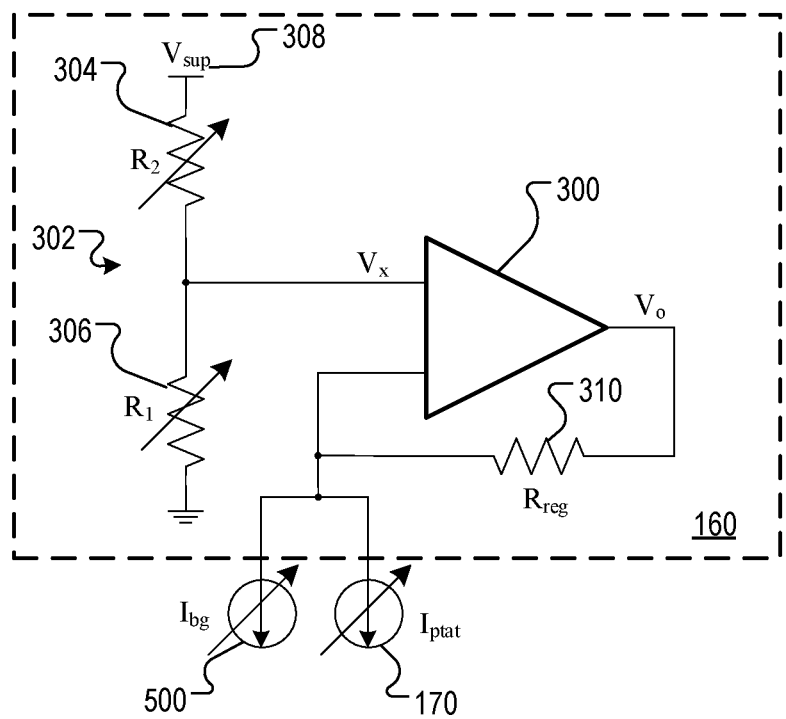
FIG. 5 is a schematic that illustrates an example of a voltage regulator having a temperature-variable current source and an additional current source.

An example of a configuration for altering the temperature-dependent slope is shown in FIG. 5, which is a schematic that depicts a voltage regulator 160 coupled to a temperature-variable current source 170 and to a variable mirror current source 500. As in previous examples, the voltage regulator 160 includes an amplifier 300 (e.g., an operational amplifier) and a voltage divider 302 coupled to a first input of the amplifier 300. The load elements 304 and 306 of the voltage regulator 160 can be set as described herein using a process monitor and process feedback circuit. Both current sources 170, 500 are coupled to the second input of the amplifier 300, and are also coupled to the amplifier output through an additional load element 310 ($R_{reg}$). The current source 500 can be configured to provide a moderating effect on the change in output voltage induced by the temperature-variable current source 170. In particular, by modifying the percentage contribution of each current source to the total current that passes through the load element 310, the slope of the output voltage with temperature can be altered.

Figure 6:
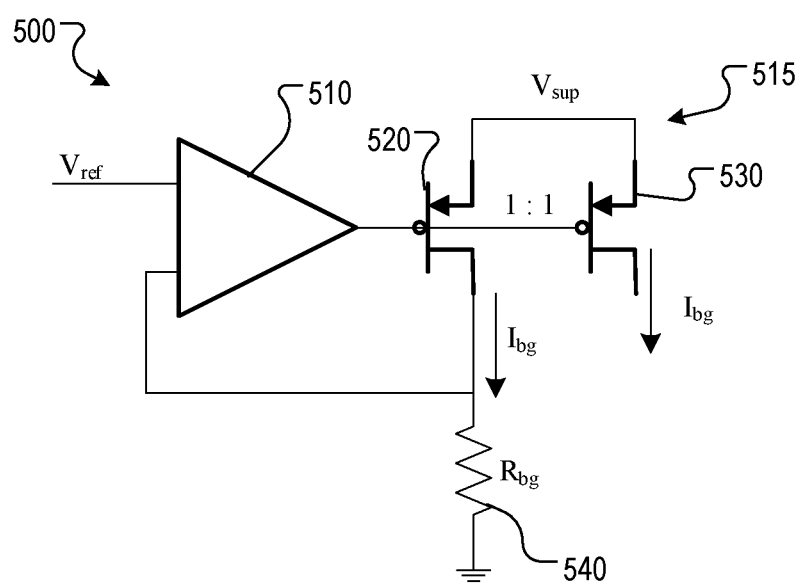
FIG. 6 is a schematic that illustrates an example of an additional current source.

FIG. 6 is a schematic that illustrates an example configuration of the variable mirror current source 500 of FIG. 5. The design shown in FIG. 6 is just one example of a variable mirror current source 500, but other configurations can be used instead. As shown in FIG. 6, the current source 500 includes an amplifier 510 (e.g., an operational amplifier). A first input of the amplifier 510 is coupled (e.g., directly coupled) to a reference voltage $V_{ref}$ that is stable with regards to temperature. The output of the amplifier is coupled to a current mirror 515. The current mirror is constructed using a first field effect transistor 520, whose gate is coupled (e.g., directly coupled) to the output of the amplifier 510. The gate of the first field effect transistor 520 also is coupled to a second field effect transistor 530 of the current mirror 515. The source of both FETs 520, 530 are coupled to a common voltage supply ($V_{sup}$), whereas the drain of the first FET 520 is coupled (e.g., directly coupled) both to a second input of the amplifier 510 and to a load element 540 ($R_{bg}$). The output current $I_{bg}$ of the current mirror 515 is obtained from the drain of the second FET 530. The 1:1 ratio shown in FIG. 6 is the current multiplication ratio between the two FET devices of the current mirror 515 and means that the current $I_{bg}$ out of FET 520 is equal to the current $I_{bg}$ out of FET 530. If, however, the ratio of the current mirror 515 were modified to be, e.g., 1:2, the current $I_{bg}$ out of FET 530 would be twice as much as the current obtained from the drain of FET 520. Modifying the ratio of current mirror 515 includes altering the ratio of the transistors in the current mirror 515. For instance, for a 1:2 ratio, a single transistor 520 and two transistors 530 may be provided. For the case of equal current in both devices, $I_{bg}$ can be expressed as $$I_{bg} = \frac{V_{ref}}{R_{bg}}.$$

$I_{bg}$ is referred to as a "band gap" current. Although the band gap current varies with temperature, when the band gap current travels through resistor 310 in regulator 160 (see FIG. 5), the temperature variation of resistor 310 causes the temperature-dependent variation in current to be cancelled out, effectively providing a temperature-independent voltage.

Figure 7:
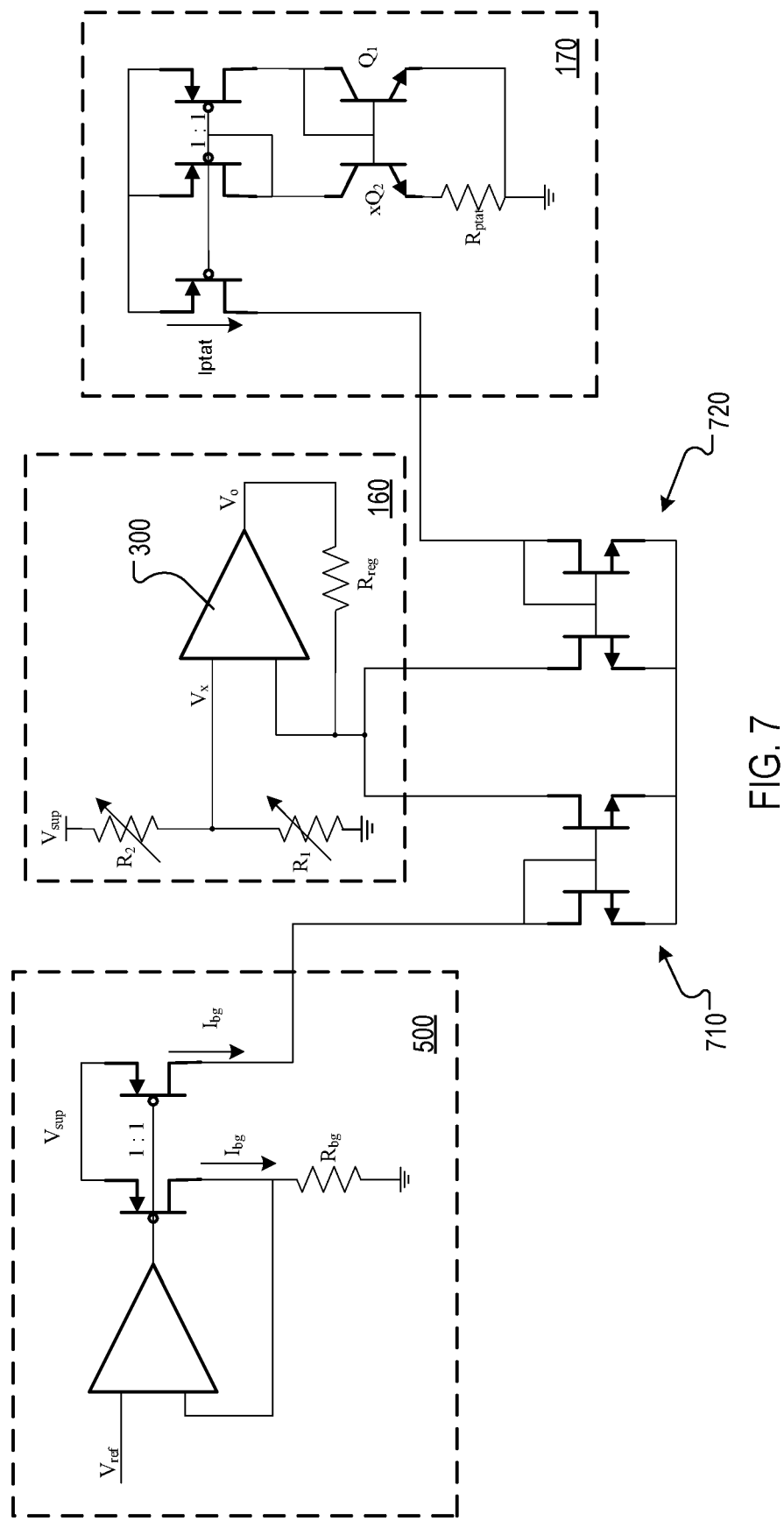
FIG. 7 is a schematic that illustrates an example of a process and temperature-variable voltage controller.

FIG. 7 is a schematic that illustrates an example of a process and temperature-variable voltage controller that incorporates both the variable mirror current source 500 from FIG. 6 and the temperature-variable current source 170 from FIG. 4B. An additional current mirror circuit 710 is introduced between the output of current source 500 and the second input of amplifier 300 to invert the direction of current provided to $R_{reg}$. Similarly, an additional current mirror circuit 720 is introduced between the output of current source 170 and the second input of amplifier 300 to invert the direction of current provided to $R_{reg}$. With both current sources coupled to the second input of amplifier 300 of voltage regulator 160, the output voltage can be expressed as:

$$V_o = \frac{V_{sup}}{1+\frac{R_2}{R_1}} + V_{ref}\frac{R_{reg}}{R_{bg}} + m_{ptat}\frac{kT}{q}\frac{R_{reg}}{R_{ptat}}\ln(x)$$

As can be seen from the foregoing equation, the output voltage Vo thus varies based on: the particular load resistance values of the voltage divider 300, as set by the process monitor 180 and process feedback circuit 190; the temperature-variable current of the supply 170; and the reference voltage $V_{ref}$ to the ratio of $R_{reg}$ and $R_{bg}$. As explained herein, the temperature variation of $I_{bg}$, is canceled out upon passing through $R_{reg}$, thus providing an effectively temperature-independent voltage. Accordingly, during operation of the device, as $I_{ptat}$ increases or decreases, the voltage created by $I_{bg}$ remains constant. Thus, the amount of $I_{bg}$ current will affect the slope of Vo because a changing percentage of the total current through $R_{reg}$ will be dependent on temperature. The magnitude of current $I_{bg}$ supplied to the voltage regulator 160 by the variable mirror source 500 can be varied based on the values used for both $R_{bg}$ and $V_{ref}$.

Figure 8:
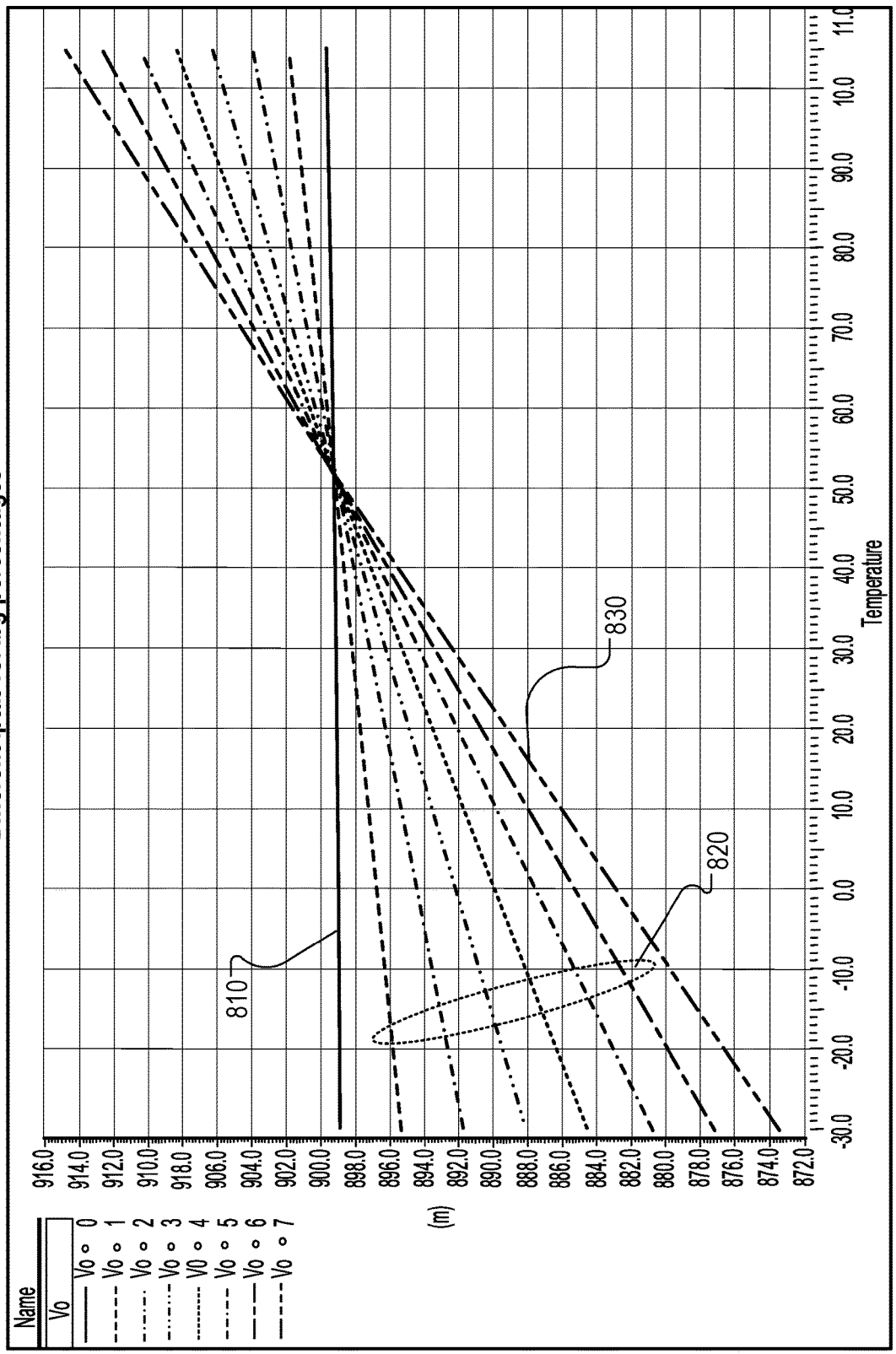
FIG. 8 is a plot that depicts output voltages of the process and temperature-variable voltage controller of FIG. 7 as a function of temperature.

FIG. 8 is a plot that depicts output voltages of the process and temperature-variable voltage controller of FIG. 7 as a function of temperature and for different percentage contributions of $I_{bg}$ and $I_{ptat}$ to the current passing through $R_{reg}$. As shown in FIG. 8, a first curve 810 represents a condition in which the percentage contribution of $I_{ptat}$ to the total current provided to $R_{reg}$ is zero. With $I_{ptat}$=0, there is no temperature-based variation in the output voltage Vo. In contrast, second curve 830 represents a condition in which the percentage contribution of $I_{bg}$ to the total current provided to $R_{reg}$ is zero. With $I_{bg}$=0, the output voltage Vo is entirely due to the temperature-dependent variation in current and any offset provided by the process corner compensation. The curves 820 between the first curve 810 and the second curve 830 represent different contributions of $I_{ptat}$ and $I_{bg}$ to the overall current provided to $R_{reg}$, such that as contribution of $I_{bg}$ decreases, the slope of the curves increase.

Figure 9:
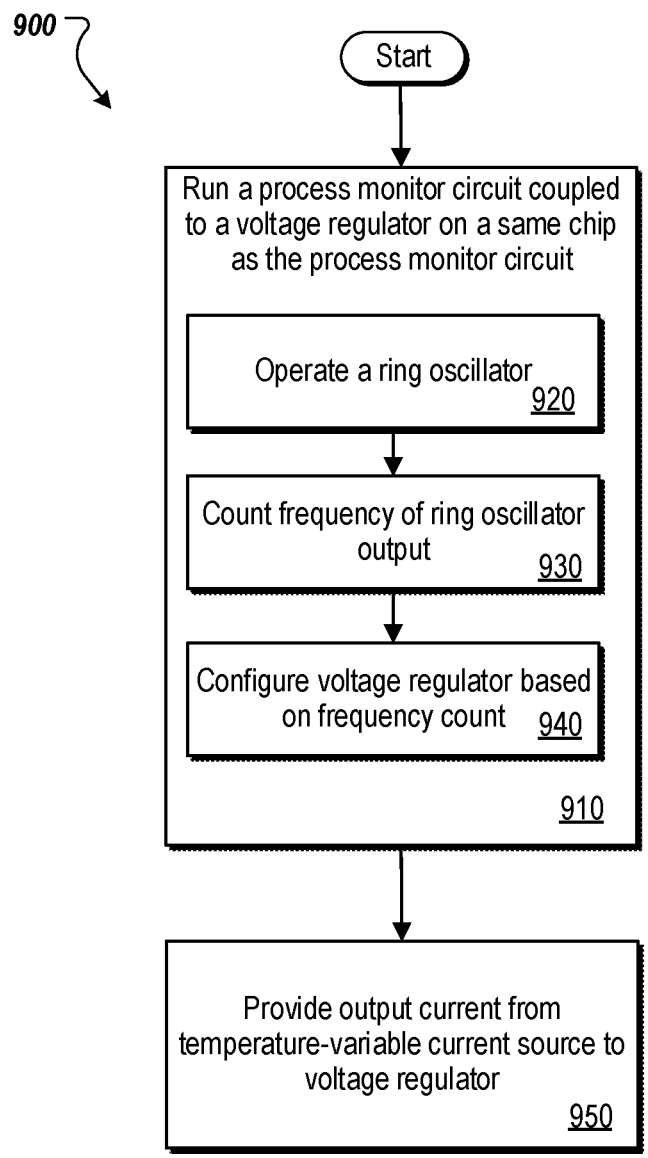
FIG. 9 is a flow chart that depicts an example process for configuring and operating the process and temperature-variable voltage controller according to the present disclosure.

FIG. 9 is a flow chart that depicts an example process 900 for configuring and operating the process and temperature-variable voltage controller according to the present disclosure. As shown in FIG. 9, in a first step 910, a process monitor circuit, such as circuit 180 that is coupled to a voltage regulator on a same chip, is run so as to determine a process corner characterizing the voltage regulator. Running the process monitor can include, e.g., operating (920) a ring oscillator, counting (930) a frequency of an output of the ring oscillator, and configuring (940) the voltage regulator based on the counted frequency so that the voltage regulator outputs a voltage that compensates for the process corner. Such compensation can include, as described herein for example, setting resistance values of variable load elements coupled to the voltage regulator. The step of running the process monitor can be done in a factory after fabrication of the chip on which the voltage regulator is formed, but before the chip is incorporated into a final device or after the chip is incorporated into a final device but before the final device is put into operation. During operation of the device in which the voltage regulator is incorporated, output current from a temperature-variable current source then can be supplied (950) to the voltage regulator to further compensate the voltage regulator output voltage based on changes in operating temperature of the device.

As already explained, the adjustable voltage regulation circuits and techniques of the present disclosure can be used with RF transmitters and receivers, such as the RF transmitter 10 and/or receiver 12 of FIGS. 1A-1B, as well as in any device that is otherwise subject to adverse phase noise and/or power drain caused by process and/or temperature variations. Moreover, the circuits and techniques disclosed herein can be used in various combinations, and are not limited by the specific examples disclosed. For instance, a temperature-variable source (e.g., source 170) can be used separate from or in combination with a temperature-dependent slope modifying circuit (e.g., current source 500). Similarly, a voltage regulator (e.g., voltage regulator 160) may be used separate from or in combination with a temperature-variable source (e.g., source 170) and/or temperature-dependent slope modifying circuit (e.g., source 500).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. For instance, the operations performed by the process feedback circuit 190 and/or the frequency counter 202 can be performed by a data processing apparatus having data storage to store the lookup table and to store instructions for the operations described herein as being performed by the process feedback circuit 190 and/or the frequency counter 202.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A device comprising a temperature-variable voltage controller, wherein the temperature-variable voltage controller comprises:
   a voltage regulator;
   a process monitor circuit coupled to the voltage regulator, wherein the process monitor circuit comprises
   a ring oscillator, and
   a frequency counter coupled to an output of the ring oscillator;
   a temperature-variable current source outputting a current which varies with temperature which is coupled to an input of the voltage regulator to produce an output voltage of the voltage regulator that is compensated based on a change in temperature of the temperature-variable current source; and
   a process feedback circuit comprising a microprocessor and memory configured to adjust the output voltage of the voltage regulator to set a resistance value of a first variable load element and to set a resistance value of a second variable load element based on an output value of the frequency counter, and wherein the microprocessor is operable to apply the output value of the frequency counter to a curve fitting function to derive the resistance value of the first variable load element and the resistance value of the second variable load element.

2. The device of claim 1, wherein the voltage regulator comprises:
   a first amplifier; and
   voltage divider coupled to a first input of the first amplifier and to a voltage supply, wherein the voltage divider comprises a first variable load element and a second variable load element.

3. The device of claim 1, wherein the process feedback circuit is coupled to the frequency counter and to the voltage regulator.

4. The device of claim 1, wherein the feedback circuit comprises:
   a lookup table stored in the memory, wherein the microprocessor is operable to select the resistance value of the first variable load element and the resistance value of the second variable load element from the memory based on the output value of frequency counter.

5. The device of claim 1, wherein the temperature-variable current source comprises a first current mirror, and an output current of the first current mirror is coupled to the voltage regulator.

6. The device of claim 5, wherein the first current mirror comprises a first regulation resistor coupled to an output of the first amplifier and to a second input of the first amplifier.

7. The device of claim 1, further comprising an additional current source coupled to the voltage regulator so that, during operation of the device, the output voltage of the voltage regulator is compensated based on a change in temperature of the temperature-variable current source and based on an output of the additional current source.

8. The device of claim 7, wherein the additional current source comprises a second current mirror, and wherein a current output of the additional current source is coupled to the voltage regulator.

9. The device of claim 8, wherein the additional current source comprises a second amplifier, wherein an output of the second amplifier is coupled to the second current mirror.

10. The device of claim 9, wherein the temperature-variable current source and the additional current source are coupled to the second input of the first amplifier of the voltage regulator.

11. The device of claim 1, further comprising:
    a RF transceiver circuit component, wherein the temperature-variable voltage controller provides a supply voltage to the RF transceiver circuit component.

12. The device of claim 1, wherein the device is a mobile communication device.

13. A method comprising:
    running a process monitor circuit coupled to a voltage regulator on a same chip as the process monitor circuit, wherein running the process monitor circuit comprises:
    operating a ring oscillator,
    counting a frequency of an output of the ring oscillator, and
    configuring the voltage regulator based on the frequency of the output of the ring oscillator by obtaining a resistance value of a first variable load element and a resistance value of a second variable load element from a curve fitting function based on the frequency of the output of the ring oscillator; and
    providing an output current which varies with temperature from a temperature-variable current source to an input of the voltage regulator so that the output voltage of the voltage regulator is compensated based on a change in temperature of the temperature-variable current source, and adjusting, by a process feedback circuit including a microprocessor, the output voltage of the voltage regulator by setting the resistance value of the first variable load element and setting the resistance value of the second variable load element.

14. The method of claim 13, wherein configuring the voltage regulator based on the frequency of the output of the ring oscillator comprises:
    selecting a resistance value of the first variable load element of the voltage regulator from memory based on the frequency of the output of the ring oscillator; and
    selecting a resistance value of the second variable load element of the voltage regulator from the memory based on the frequency of the output of the ring oscillator.

15. The method of claim 13, wherein the temperature-variable current source comprises a first current mirror, and wherein an output current of the first current mirror is coupled to the voltage regulator.

16. The method of claim 13, further comprising:
    providing an output current from an additional current source to the voltage regulator so that the output voltage of the voltage regulator is compensated based on a combined output current from the temperature-variable current source and the additional current source.

17. The method of claim 16, wherein the additional current source comprises a second current mirror, and wherein an output current of the second current mirror is coupled to the voltage regulator.

18. The method of claim 13, further comprising providing the output voltage of the voltage regulator as a supply voltage to circuit component of an RF transceiver.

* * * * *